United States Patent
Carbajal et al.

(10) Patent No.: US 8,220,548 B2
(45) Date of Patent: Jul. 17, 2012

(54) SURFACTANT WASH TREATMENT FLUIDS AND ASSOCIATED METHODS

(75) Inventors: David L. Carbajal, Houston, TX (US); Kenneth W. Oyler, Baytown, TX (US); William Shumway, Houston, TX (US); Ian Robb, Duncan, OK (US); Eric Davidson, Aberdeen, SC (US)

(73) Assignee: Halliburton Energy Services Inc., Duncan, OK (US)

( * ) Notice: Subject to any disclaimer, the term of this patent is extended or adjusted under 35 U.S.C. 154(b) by 967 days.

(21) Appl. No.: 11/622,898

(22) Filed: Jan. 12, 2007

(65) Prior Publication Data

US 2008/0169102 A1 Jul. 17, 2008

(51) Int. Cl.
 *E21B 21/00* (2006.01)
 *E21B 37/00* (2006.01)
(52) U.S. Cl. .............. 166/312; 166/305.1; 166/300
(58) Field of Classification Search ............ None
 See application file for complete search history.

(56) References Cited

U.S. PATENT DOCUMENTS

| | | |
|---|---|---|
| 2,238,671 A | 4/1941 | Woodhouse |
| 2,703,316 A | 3/1955 | Palmer |
| 3,173,484 A | 3/1965 | Huitt et al. |
| 3,195,635 A | 7/1965 | Fast |
| 3,272,650 A | 9/1966 | MacVittie |
| 3,302,719 A | 2/1967 | Fischer |
| 3,364,995 A | 1/1968 | Atkins et al. |
| 3,366,178 A | 1/1968 | Malone et al. |
| 3,455,390 A | 7/1969 | Gallus |
| 3,784,585 A | 1/1974 | Schmitt et al. |
| 3,819,525 A | 6/1974 | Hattenbrun |
| 3,828,854 A | 8/1974 | Templeton et al. |
| 3,836,465 A | 9/1974 | Rhudy et al. |
| 3,868,998 A | 3/1975 | Lybarger et al. |
| 3,912,692 A | 10/1975 | Casey et al. |
| 3,948,672 A | 4/1976 | Harnsberger |
| 3,955,993 A | 5/1976 | Curtice |
| 3,960,736 A | 6/1976 | Free et al. |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,169,798 A | 10/1979 | DeMartino |
| 4,172,066 A | 10/1979 | Zweigle et al. |
| 4,261,421 A | 4/1981 | Watanabe |
| 4,265,673 A | 5/1981 | Pace et al. |
| 4,267,887 A | 5/1981 | Watanabe |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. |
| 4,848,467 A | 7/1989 | Cantu et al. |
| 4,863,980 A | 9/1989 | Cowan et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. |

(Continued)

FOREIGN PATENT DOCUMENTS

| | | |
|---|---|---|
| EP | 0 510 762 | 10/1992 |
| EP | 0 879 935 | 2/1999 |
| EP | 1 413 710 | 4/2004 |
| GB | 2109034 A | 5/1983 |
| GB | 2116966 A | 10/1983 |
| GB | 2 412 389 | 3/2004 |
| JP | 2004181820 A | 7/2004 |

(Continued)

OTHER PUBLICATIONS

Heller, Jorge and Barr, John; "Poly(ortho esters)—From Concept to Reality"; BioMacromolecules; vol. 5, No. 5; pp. 1625-1632, Sep./Oct. 2004.

(Continued)

*Primary Examiner* — Angela M DiTrani

(74) *Attorney, Agent, or Firm* — Craig Roddy; Baker Botts LLP

(57) ABSTRACT

Of the many methods and compositions provided herein, in one embodiment, the invention provides a method comprising: providing an oil-wet well bore surface; providing a surfactant wash treatment fluid that comprises an acid-compatible surfactant, an acid and/or an acid-generating component, and an aqueous fluid; contacting the oil-wet well bore surface with the surfactant wash treatment fluid; allowing the oil-wet well bore surface to become water-wet; and producing fluids from the formation. In another embodiment, the invention provides a surfactant wash treatment fluid for use in a subterranean formation comprising an aqueous fluid, an acid-compatible surfactant, an acid and/or an acid-generating component.

20 Claims, 4 Drawing Sheets

U.S. PATENT DOCUMENTS

| | | | |
|---|---|---|---|
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawton et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck | |
| 5,670,473 A | 9/1997 | Scepanski | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Normal et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,888,944 A * | 3/1999 | Patel | 166/300 |
| 5,893,416 A | 4/1999 | Read | |
| 5,905,061 A | 5/1999 | Patel | 507/129 |
| 5,908,073 A | 6/1999 | Nguyen et al. | |
| 5,909,774 A | 6/1999 | Griffith et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,977,031 A | 11/1999 | Patel | 507/138 |
| 5,979,557 A | 11/1999 | Card et al. | |
| 5,985,800 A | 11/1999 | Patel | 507/129 |
| 5,990,050 A | 11/1999 | Patel | 507/136 |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,029,755 A | 2/2000 | Patel | 175/50 |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | 166/300 |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,218,342 B1 | 4/2001 | Patel | 507/129 |
| 6,221,920 B1 | 4/2001 | Hillion et al. | |
| 6,242,390 B1 | 6/2001 | Mitchell et al. | |
| 6,258,859 B1 | 7/2001 | Dahayanake et al. | 516/77 |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | 175/50 |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,405,809 B2 | 6/2002 | Patel et al. | 175/50 |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer et al. | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,589,917 B2 | 7/2003 | Patel et al. | 507/138 |
| 6,599,863 B1 | 7/2003 | Palmer et al. | |
| 6,608,006 B2 | 8/2003 | Taylor et al. | 507/131 |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,691,805 B2 | 2/2004 | Thaemlitz | 175/65 |
| 6,702,023 B1 | 3/2004 | Harris et al. | |
| 6,710,019 B1 | 3/2004 | Sawdon et al. | |
| 6,716,797 B2 | 4/2004 | Brookey | |
| 6,737,385 B2 | 5/2004 | Todd et al. | |
| 6,761,218 B2 | 7/2004 | Nguyen et al. | |
| 6,763,888 B1 | 7/2004 | Harris et al. | |
| 6,764,981 B1 | 7/2004 | Eoff et al. | |
| 6,790,811 B2 | 9/2004 | Patel | 507/129 |
| 6,793,018 B2 | 9/2004 | Dawson et al. | |
| 6,793,025 B2 | 9/2004 | Patel et al. | 175/50 |
| 6,793,730 B2 | 9/2004 | Reddy et al. | |
| 6,806,233 B2 | 10/2004 | Patel | 507/129 |
| 6,806,235 B1 | 10/2004 | Mueller et al. | |
| 6,817,414 B2 | 11/2004 | Lee | |
| 6,818,594 B1 | 11/2004 | Freeman et al. | |
| 6,837,309 B2 | 1/2005 | Boney et al. | |
| 6,840,318 B2 | 1/2005 | Lee et al. | |
| 6,852,173 B2 | 2/2005 | Banerjee et al. | |
| 6,861,394 B2 | 3/2005 | Ballard et al. | |
| 6,877,563 B2 * | 4/2005 | Todd et al. | 166/312 |

| | | | | | | |
|---|---|---|---|---|---|---|
| 6,881,709 B2 | 4/2005 | Nelson et al. ............... 507/203 | | 2004/0170836 A1 | 9/2004 | Bond et al. |
| 6,883,608 B2 | 4/2005 | Parlar et al. ............... 166/278 | | 2004/0176478 A1 | 9/2004 | Dahayanake et al. ........... 516/77 |
| 6,886,635 B2 | 5/2005 | Hossaini et al. | | 2004/0231845 A1 | 11/2004 | Cooke, Jr. |
| 6,896,058 B2 | 5/2005 | Munoz, Jr. et al. | | 2004/0259738 A1* | 12/2004 | Patel ............... 507/100 |
| 6,904,971 B2 | 6/2005 | Brothers et al. | | 2005/0028976 A1 | 2/2005 | Nguyen |
| 6,908,887 B2 | 6/2005 | Thaemlitz ............... 507/131 | | 2005/0034861 A1 | 2/2005 | Saini et al. |
| 6,908,888 B2 | 6/2005 | Lee et al. ............... 507/219 | | 2005/0059556 A1 | 3/2005 | Munoz, Jr. et al. |
| 6,949,491 B2 | 9/2005 | Cooke, Jr. | | 2005/0059557 A1 | 3/2005 | Todd et al. |
| 6,959,767 B2 | 11/2005 | Horton et al. | | 2005/0059558 A1 | 3/2005 | Blauch et al. |
| 6,978,838 B2 | 12/2005 | Parlar et al. | | 2005/0126785 A1 | 6/2005 | Todd et al. |
| 6,981,552 B2 | 1/2006 | Reddy et al. | | 2005/0130848 A1 | 6/2005 | Todd et al. |
| 6,983,801 B2 | 1/2006 | Dawson et al. | | 2005/0183741 A1 | 8/2005 | Surjaatmadja et al. |
| 6,987,083 B2 | 1/2006 | Phillippi et al. | | 2005/0205266 A1 | 9/2005 | Todd et al. |
| 6,989,354 B2 | 1/2006 | Thaemlitz et al. ............... 507/131 | | 2005/0272613 A1 | 12/2005 | Cooke, Jr. |
| 6,997,259 B2 | 2/2006 | Nguyen | | 2005/0277554 A1 | 12/2005 | Blauch et al. |
| 7,000,701 B2 | 2/2006 | Todd et al. | | 2006/0016596 A1 | 1/2006 | Pauls et al. |
| 7,007,752 B2 | 3/2006 | Reddy et al. | | 2006/0032633 A1 | 2/2006 | Nguyen |
| 7,021,377 B2 | 4/2006 | Todd et al. | | 2006/0041028 A1 | 2/2006 | Crews ............... 516/135 |
| 7,021,383 B2 | 4/2006 | Todd et al. ............... 166/307 | | 2006/0046938 A1 | 3/2006 | Harris et al. |
| 7,032,663 B2 | 4/2006 | Nguyen | | 2006/0065397 A1 | 3/2006 | Nguyen et al. |
| 7,036,585 B2 | 5/2006 | Zhou et al. ............... 166/268 | | 2006/0105917 A1 | 5/2006 | Munoz, Jr. et al. |
| 7,036,586 B2 | 5/2006 | Roddy et al. | | 2006/0105918 A1 | 5/2006 | Munoz, Jr. et al. |
| 7,036,587 B2 | 5/2006 | Munoz, Jr. et al. | | 2006/0108150 A1 | 5/2006 | Luke et al. |
| 7,044,220 B2 | 5/2006 | Nguyen et al. | | 2006/0118300 A1 | 6/2006 | Welton et al. |
| 7,044,224 B2 | 5/2006 | Nguyen | | 2006/0169182 A1 | 8/2006 | Todd et al. |
| 7,049,272 B2 | 5/2006 | Sinclair et al. | | 2006/0169450 A1 | 8/2006 | Mang et al. |
| 7,052,901 B2 | 5/2006 | Crews ............... 435/281 | | 2006/0172891 A1 | 8/2006 | Gewehr et al. |
| 7,063,151 B2 | 6/2006 | Nguyen et al. | | 2006/0172893 A1 | 8/2006 | Todd et al. |
| 7,066,258 B2 | 6/2006 | Justus et al. | | 2006/0172894 A1 | 8/2006 | Mang et al. |
| 7,066,260 B2 | 6/2006 | Sullivan et al. | | 2006/0172895 A1 | 8/2006 | Mang et al. |
| 7,069,994 B2 | 7/2006 | Cooke, Jr. | | 2006/0180308 A1 | 8/2006 | Welton et al. ............... 166/282 |
| 7,080,688 B2 | 7/2006 | Todd et al. | | 2006/0180309 A1 | 8/2006 | Welton et al. ............... 166/282 |
| 7,093,658 B2 | 8/2006 | Chatterji et al. | | 2006/0180310 A1 | 8/2006 | Welton et al. ............... 166/283 |
| 7,093,664 B2 | 8/2006 | Todd et al. | | 2006/0183646 A1 | 8/2006 | Welton et al. ............... 507/259 |
| 7,096,947 B2 | 8/2006 | Todd et al. | | 2006/0185848 A1 | 8/2006 | Surjaatmadja et al. |
| 7,098,171 B2 | 8/2006 | Thaemlitz ............... 507/121 | | 2006/0234873 A1 | 10/2006 | Ballard |
| 7,101,829 B2 | 9/2006 | Guichard et al. | | 2006/0258543 A1 | 11/2006 | Saini |
| 7,112,557 B2 | 9/2006 | Thaemlitz ............... 507/116 | | 2006/0258544 A1 | 11/2006 | Saini |
| 7,131,491 B2 | 11/2006 | Blauch et al. | | 2006/0276345 A1 | 12/2006 | Todd et al. |
| 7,132,389 B2 | 11/2006 | Lee | | 2006/0283597 A1 | 12/2006 | Schreiner et al. |
| 7,140,438 B2 | 11/2006 | Frost et al. | | 2007/0100029 A1 | 5/2007 | Reddy et al. |
| 7,147,067 B2 | 12/2006 | Getzlaf et al. | | 2007/0298977 A1 | 12/2007 | Mang et al. |
| 7,151,077 B2 | 12/2006 | Prud'homme et al. | | 2008/0009423 A1 | 1/2008 | Mang et al. |
| 7,153,902 B2 | 12/2006 | Altes et al. | | 2008/0169103 A1 | 7/2008 | Carbajal et al. |
| 7,156,174 B2 | 1/2007 | Roddy et al. | | | | |
| 7,165,617 B2 | 1/2007 | Lord et al. | | | FOREIGN PATENT DOCUMENTS | |
| 7,166,560 B2 | 1/2007 | Still et al. | | WO | WO 93/15127 | 8/1993 |
| 7,168,489 B2 | 1/2007 | Frost et al. | | WO | WO 94/07949 | 4/1994 |
| 7,172,022 B2 | 2/2007 | Reddy et al. | | WO | WO 94/08078 | 4/1994 |
| 7,178,596 B2 | 2/2007 | Blauch et al. | | WO | WO 94/08090 | 4/1994 |
| 7,195,068 B2 | 3/2007 | Todd | | WO | WO 95/09879 | 4/1995 |
| 7,204,311 B2 | 4/2007 | Welton et al. | | WO | WO 97/11845 | 4/1997 |
| 7,204,312 B2 | 4/2007 | Roddy et al. | | WO | WO 99/27229 | 6/1999 |
| 7,205,264 B2 | 4/2007 | Boles | | WO | WO 00/57022 | 9/2000 |
| 7,216,705 B2 | 5/2007 | Saini et al. | | WO | WO 01/02698 | 1/2001 |
| 7,219,731 B2 | 5/2007 | Sullivan | | WO | WO 01/87797 | 11/2001 |
| 7,228,904 B2 | 6/2007 | Todd et al. | | WO | WO 01/94744 | 12/2001 |
| 7,256,159 B2 | 8/2007 | Guichard et al. | | WO | WO 02/55843 | 1/2002 |
| 7,261,156 B2 | 8/2007 | Nguyen et al. | | WO | WO 02/12674 | 2/2002 |
| 7,264,051 B2 | 9/2007 | Nguyen et al. | | WO | WO 03/027431 | 4/2003 |
| 7,265,079 B2 | 9/2007 | Wilbert et al. | | WO | WO 2004/007905 | 1/2004 |
| 7,267,170 B2 | 9/2007 | Mang et al. | | WO | WO 2004/037946 | 5/2004 |
| 7,276,466 B2 | 10/2007 | Todd et al. | | WO | WO 2004/038176 | 5/2004 |
| 7,299,869 B2 | 11/2007 | Kalman | | WO | 2005095755 A1 | 10/2005 |
| 7,303,014 B2 | 12/2007 | Reddy et al. | | | | |
| 7,306,037 B2 | 12/2007 | Nguyen et al. | | | OTHER PUBLICATIONS | |
| 7,322,412 B2 | 1/2008 | Badalamenti et al. | | | | |
| 2001/0016562 A1 | 8/2001 | Muir et al. | | Quintero, L; Jones, T. (SPE) and Clark, D.E. (SPE, Baker Hughes Drilling Fluids), "One-Step Acid Removal of an Invert Emulsion", SPE 94604, pp. 1-9, 2005. | | |
| 2002/0119169 A1 | 8/2002 | Angel et al. | | | | |
| 2003/0054962 A1 | 3/2003 | England et al. | | | | |
| 2003/0130133 A1 | 7/2003 | Vollmer | | Designation: G 111-97; "Standard Guide for Corrosion Tests in High Temperature or High Pressure Environment, or Both"; ASTM International, pp. 1-5, Dec. 1997. | | |
| 2003/0147965 A1 | 8/2003 | Basset et al. | | | | |
| 2003/0230407 A1 | 12/2003 | Vijn et al. | | | | |
| 2004/0014606 A1 | 1/2004 | Parlar et al. | | | | |
| 2004/0070093 A1 | 4/2004 | Mathiowitz et al. | | Designation: G 111-97 (Reapproved 2006); "Standard Guide for Corrosion Tests in High Temperature or High Pressure Environment, or Both"; ASTM International, pp. 1-5, May 2006. | | |
| 2004/0072696 A1 | 4/2004 | Patel ............... 507/100 | | | | |
| 2004/0099416 A1 | 5/2004 | Vijn et al. | | | | |
| 2004/0138068 A1 | 7/2004 | Rimmer et al. | | U.S. Appl. No. 11/622,907, filed Jan. 12, 2007. | | |
| 2004/0152601 A1 | 8/2004 | Still et al. | | Material Safety Data Sheet, "Ethomeen® SV/12", Akzo Nobel, May 7, 2003. | | |

Material Safety Data Sheet, "GS 22 Series (89A, 89B, 91A, 91B, 92A, 92B, 94A, 94B)", Special Products, Nov. 10, 2005.
Material Safety Data Sheet, "Synperonic PE/L64", Nov. 22, 2005.
Product Bulletin, "Amphosol® LB", Stepan, Sep. 21, 2006.
Simmons, et al., Poly(phenyllactide): Synthesis, Characterization, and Hydrolytic Degradation, Biomacromolecules, vol. 2, No. 2, 2001 (pp. 658-663).
Yin, et al., Preparation and Characterization of Substituted Polylactides, American Chemical Society, vol. 32, No. 23, 1999 (pp. 7711-7718).
Yin, et al., Synthesis and Properties of Polymers Derived form Substituted Lactic Acids, American Chemical Society, Ch. 12, 2001 (pp. 147-159).
Cantu, et al, Laboratory and Field Evaluation of a Combined Fluid-Loss-Control Additive and Gel Breaker for Fracturing Fluids, SPE 18211, Society of Petroleum Engineers, 1990.
Love, et al, Selectively Placing Many Fractures in Openhole Horizontal Wells Improves Production, SPE 50422, Society of Petroleum Engineers, 1998.
McDaniel, et al, Evolving New Stimulation Process Proves Highly Effective in Level 1 Dual-Lateral Completion, SPE 78697, Society of Petroleum Engineers, 2002.
Albertsson, et al, Aliphatic Polyesters: Systhesis, Properties and Applications, Advances in Polymer Science, vol. 157, Degradable Aliphatic Polyesters, 2002.
Dechy-Cabaret, et al, Controlled Ring-Opening Polymerization of Lactide and Glycolide, American Chemical Society, Chemical Reviews, A-Z, AA-AD, received 2004.
Funkhouser, et al, Synthetic Polymer Fracturing Fluid for High-Temperature Applications, SPE 80236, Society of Petroleum Engineers, 2003.
Chelating Agents, Encyclopedia of Chemical Technology, vol. 5 (764-795).
Vichaibun, et al, A New Assay for the Enzymatic Degradation of Polylactic Acid, Short Report, ScienceAsia, vol. 29, 2003 (pp. 297-300).
Halliburton, SurgiFrac$^{SM}$ Service, A Quick and Cost-Effective Method to Help Boost Production From Openhole Horizontal Completions, Halliburton Communications, HO3297, 2002.
Halliburton, Cobra Frac$^{SM}$ Service, Coiled Tubing Fracturing—Cost-Effective Method for Stimulating Untapped Reserves, HO2319R, Halliburton Energy Services, 2000.
Halliburton, CobraJet Frac$^{SM}$ Service, Cost-effective Technology That Can Help Reduce Cost Per BOE Produced, Shorten Cycle Time and Reduce Capex, Halliburton Communications.
Y. Chiang et al., Hydrolysis of Ortho Esters; Further Investigation of the Factors Which Control The Rate-Determining Step, Engineering Information, Inc. NY, NY, vol. 105, No. 23 (XP-002322842).
M. Ahmad, et al., Ortho Ester Hydrolysis: Direct Evidence For a Three-Stage Reaction Mechanism, Engineering Information, Inc. NY, NY, vol. 101, No. 10 (XP-002322843).
Skrabal et al, The Hydrolysis Rate of Orthoformic Acid Ethyl Ether, Chemical Institute of the University of Graz, Jan. 13, 1921, pp. 1-38.
Schwach-Abdellaoui, et al., Hydrolysis and Erosion Studies of Autocatalyzed Poly(ortho esters) Containing Lactoyl-Lactyl Acid Dimers, American Chemical Society, vol. 32, No. 2, 1999 (pp. 301-307).

Ng, et al., Synthesis and Erosion Studies of Self-Catalyzed Poly(ortho ester)s, American Chemical Society, vol. 30, No. 4, 1997 (pp. 770-772).
Ng, et al., Development of a Poly(ortho ester) prototype With a Latent Acid in The Polymer Backbone For 5-fluorouracil Delivery, Journal of Controlled Release 65 (2000), (pp. 367-374).
Rothen-Weinhold, et al., Release of BSA from poly(ortho ester) extruded thin strands Journal of Controlled Release 71, 2001, (pp. 31-37).
Heller, et al., Poly(ortho ester)s—their development and some recent applications, European Journal of Pharmaceutics and Biopharmaceutics, 50, 2000, (pp. 121-128).
Heller, et al., Poly(ortho esters); synthesis, characterization, properties and uses, Advanced Drug Delivery Reviews, 54, 2002, (pp. 1015-1039).
Heller, et al., Poly(ortho esters) For the Pulsed and Continuous Delivery of Peptides and Proteins, Controlled Release and Biomedical Polymers Department, SRI International, (pp. 39-46).
Zignani, et al., Subconjunctival biocompatibility of a viscous bioerodable poly(ortho ester), J. Biomed Mater Res, 39, 1998, pp. 277-285.
Toncheva, et al., Use of Block Copolymers of Poly(Ortho Esters) and Poly (Ethylene Glycol), Journal of Drug Targeting, 2003, vol. 11(6), pp. 345-353.
Schwach-Abdellaoui, et al., Control of Molecular Weight for Auto-Catalyzed Poly(ortho ester) Obtained by Polycondensation Reaction, International Journal of Polymer Anal. Charact., 7: 145-161, 2002, pp. 145-161.
Heller, et al., Release of Norethindrone from Poly(Ortho Esters), Polymer Engineering and Science, Mid-Aug. 1981, vol. 21, No. 11 (pp. 727-731).
Cordes, et al., Mechanism and Catalysis for Hydrolysis of Acetals, Ketals, and Other Esters, Department of Chemistry, Indiana University, Bloomington, Indiana, Chemical Reviews, 1974, vol. 74, No. 5, pp. 581-603.
Todd, et al., A Chemcial "Trigger" Useful for Oilfield Applications, Society of Petroleum Engineers, Inc., SPE 92709.
Kiyoshi Matsuyama et al, Environmentally benign formation of polymeric microspheres by rapid expansion of supercritical carbon dioxide solution with a nonsolvent, Environ Sci Technol 2001, 35, 4149-4155.
Product Data Sheet, "Baracarb," Halliburton Fluid Systems, Baroid Fluid Services, Sep. 5, 2006.
Product Data Sheet, "Geltone® II," Halliburton Fluid Systems, Baroid Fluid Services, Sep. 5, 2006.
Product Data Sheet, "Rhemod™ L," Halliburton Fluid Systems, Baroid Fluid Services, Sep. 5, 2006.
Product Data Sheet, "Le Supermul™," Halliburton Fluid Systems, Baroid Fluid Services, Jan. 9, 2007.
Office Action from U.S. Appl. No. 11/622,907, Mar. 19, 2008.
Office Action for U.S. Appl. No. 11/622,907, mailed Feb. 10, 2009.
Office Action for U.S. Appl. No. 11/622,907 dated Nov. 13, 2008.

* cited by examiner

SURFACTANT WASH TREATMENT FLUIDS AND ASSOCIATED METHODS

BACKGROUND

The present invention relates to clean up operations in subterranean well bores, and more particularly, to surfactant wash treatment fluids that may be used in clean-up operations to render the well bore water-wet and/or remove oil wet solids in well bores that may be present as a result of using oil-based drilling or drill-in fluids or other fluids including aqueous-based fluids that may comprise an oily component. The compositions and methods of the present invention are applicable to both hydrocarbon-producing wells as well as to injection wells.

Oil-based fluids, e.g., drilling or drill-in fluids are often used in subterranean applications. The choice of oil-based or water based types of fluids is often driven by performance characteristics of each fluid, the type of well to be drilled, cost considerations and the characteristics of the oil or gas field in which the well is to be drilled as well as environmental concerns.

The primary potential benefits of selecting an oil-based fluid are thought to include: superior hole stability, especially in shale formations; well bores with less wash out potential, providing wells that are more in gauge with the bit; formation of a thinner filter cake than a filter cake achieved with a water-based fluid; excellent lubrication of the drill string and down hole tools; penetration of salt beds without sloughing or enlargement of the hole; greater rate of bit penetration; better tolerance to fluid contamination as well as other benefits that should be known to those skilled in the art. Alternatively, a water based fluid may be used that contains a substantial amount of an oily component(s) in order to achieve some of these same performance characteristics as oil based fluids. The primary potential benefits of using such a fluid are thought to include: faster rate of penetration and superior hole stability relative to other water based fluids. Potential drawbacks may include possible increased rheology, fluid incompatibility, lower hole stability relative to oil based fluids, and potential environmental concerns. Perhaps one of the main advantages of adding oil to a well bore fluid is to reduce the density of the fluid, which may be desirable in certain circumstances.

Oil-based fluids usually contain some water, either formed in the formulation of the drilling fluid itself, or residual water in the hole, or intentionally added water to affect the properties of the drilling fluid or mud. Those that contain intentionally added water are often in an emulsion form, and are often referred to as invert emulsions. In such emulsions, an emulsifier is usually included to stabilize the emulsion. Typical examples of such emulsifiers include polyvalent metal soaps, fatty acids, fatty acid soaps, fatty amides, and other similar suitable compounds.

An especially beneficial property of oil-based fluids is their excellent lubrication qualities. These lubrication properties permit the drilling of wells having a significant vertical deviation, as is typical in off-shore or deep water drilling operations or when a horizontal well is desired. In such highly deviated holes, torque and drag on the drill string can be a significant problem because the drill pipe lies against the low side of the hole, and the risk of pipe sticking is high when water based fluids are used. In contrast, oil-based fluids provide a thin, slick filter cake which helps to prevent pipe sticking, and thus the use of the oil-based fluid may be beneficial.

Despite the many advantages of utilizing oil-based fluids, they have been associated with several disadvantages. Generally speaking, the use of oil-based drilling fluids and fluids can have high initial and operational costs. These costs can be significant depending on the depth of the hole to be drilled. However, the higher costs may be justified by the improved performance of the oil based drilling fluid, which in addition to the previously mention benefits also may prevent the caving in or hole enlargement that can greatly increase drilling time. Use of oil based fluids can often result in lower overall well construction costs because of simplified drilling and reduced subsequent completion costs.

One of the main drawbacks of using oil-based fluids in the hydrocarbon bearing portion of the well-bore is that the filter cake usually should be cleaned up for optimum production to occur. For proper clean up so as to afford the greatest hydrocarbon production, the filter cake preferably needs to be removed and the formation solids should be left water-wet. To clean up the well bore when an oil based fluid has been used, the oil-wet filter cake should be treated in some manner that results in converting the oil-wet solids contained in the filter cake to water-wet solids, which can then be treated and removed from the well bore. The resultant well bore should be rendered water-wet. Production can then occur. Production after a clean up is often thought to be superior to production without filter cake clean up.

One method that has been developed to clean up oil-wet solids that remain in the well bore as a result of using an oil-based fluid is a two-step process involving a mutual solvent treatment followed by an acid treatment. Using a mutual solvent to clean up oil-wet solids that result from using an oil based fluid is often thought to be necessary prior to acid treatment to avoid the formation of an undesirable residue that is extremely viscous and that can cause more damage from emulsion blockage than not doing the clean up in the first place. In such treatments, a solvent that is soluble in oil and water usually is used to wash away the oil from the solids so that the solids can then be dissolved or broken down by an acid treatment. Examples of suitable mutual solvents may include isopropanol or EGMBE. Washing the solids with the mutual solvent is thought to enable the acid to interact with the solids to degrade them.

There are several disadvantages associated with this process. First, it is a multi-step process, thus involving additional time and expense. Second, the mutual solvent may present environmental considerations and handling concerns for personnel. Third, the process can be time-consuming because the time needed for the solvent to change the wettability of the solids may take days of rig time. Additionally, when a strong acid is used after the mutual solvent, often the acid will not be evenly distributed in the well bore, and the result will be incomplete clean up because the acid will be spent in localized areas where it contacts the formation rather than uniformly attacking the now water-wet solids. Also, there are some concerns that this type of process may not be effective generally. For instance, the long-term effects on productivity are unknown.

SUMMARY

The present invention relates to clean up operations in subterranean well bores, and more particularly, to surfactant wash treatment fluids that may be used in clean-up operations to render the well bore water-wet and/or remove oil wet solids in well bores that may be present as a result of using oil-based drilling or drill-in fluids or other fluids including aqueous-based fluids that may comprise an oily component.

In one embodiment, the present invention provides a method comprising: providing an oil-wet well bore surface;

providing a surfactant wash treatment fluid that comprises an acid-compatible surfactant, an acid and/or an acid-generating component, and an aqueous fluid; contacting the oil-wet well bore surface with the surfactant wash treatment fluid; allowing the oil-wet well bore surface to become water-wet; and producing fluids from the formation.

In one embodiment, the present invention provides a method comprising: providing an oil-wet solid located in a subterranean formation; providing a surfactant wash treatment fluid that comprises an acid-compatible surfactant, an acid and/or an acid-generating component, and an aqueous fluid; contacting the oil-wet solid with the surfactant wash treatment fluid; and allowing the oil-wet solid to become water-wet.

In one embodiment, the present invention provides a method comprising: providing an oil-wet well bore surface; providing a surfactant wash treatment fluid that comprises an acid-compatible surfactant, an acid and/or an acid-generating component, and an aqueous fluid; and contacting the well bore surface with the surfactant wash treatment fluid.

In one embodiment, the present invention provides a method comprising: drilling a well bore using an oil-based fluid or an aqueous fluid comprising an oily component; creating an oil-wet well bore surface; providing a surfactant wash treatment fluid that comprises an acid-compatible surfactant, an acid and/or an acid-generating component, and an aqueous fluid; contacting the oil-wet well bore surface with the surfactant wash treatment fluid; and allowing the oil-wet well bore surface to become water wet.

In one embodiment, the present invention provides a method comprising: drilling a well bore in a subterranean formation using a fluid that is oil-based or an aqueous-based fluid that comprises an oily component wherein oil-wet solids are deposited on a surface within the well bore; providing a surfactant wash treatment fluid that comprises an aqueous fluid, an acid-compatible surfactant; and an acid and/or an acid-generating component; introducing the surfactant wash treatment fluid into the subterranean formation; and allowing production to occur.

In one embodiment, the present invention provides a surfactant wash treatment fluid for use in a subterranean formation comprising an aqueous fluid, an acid-compatible surfactant, an acid and/or an acid-generating component.

Other and further objects, features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
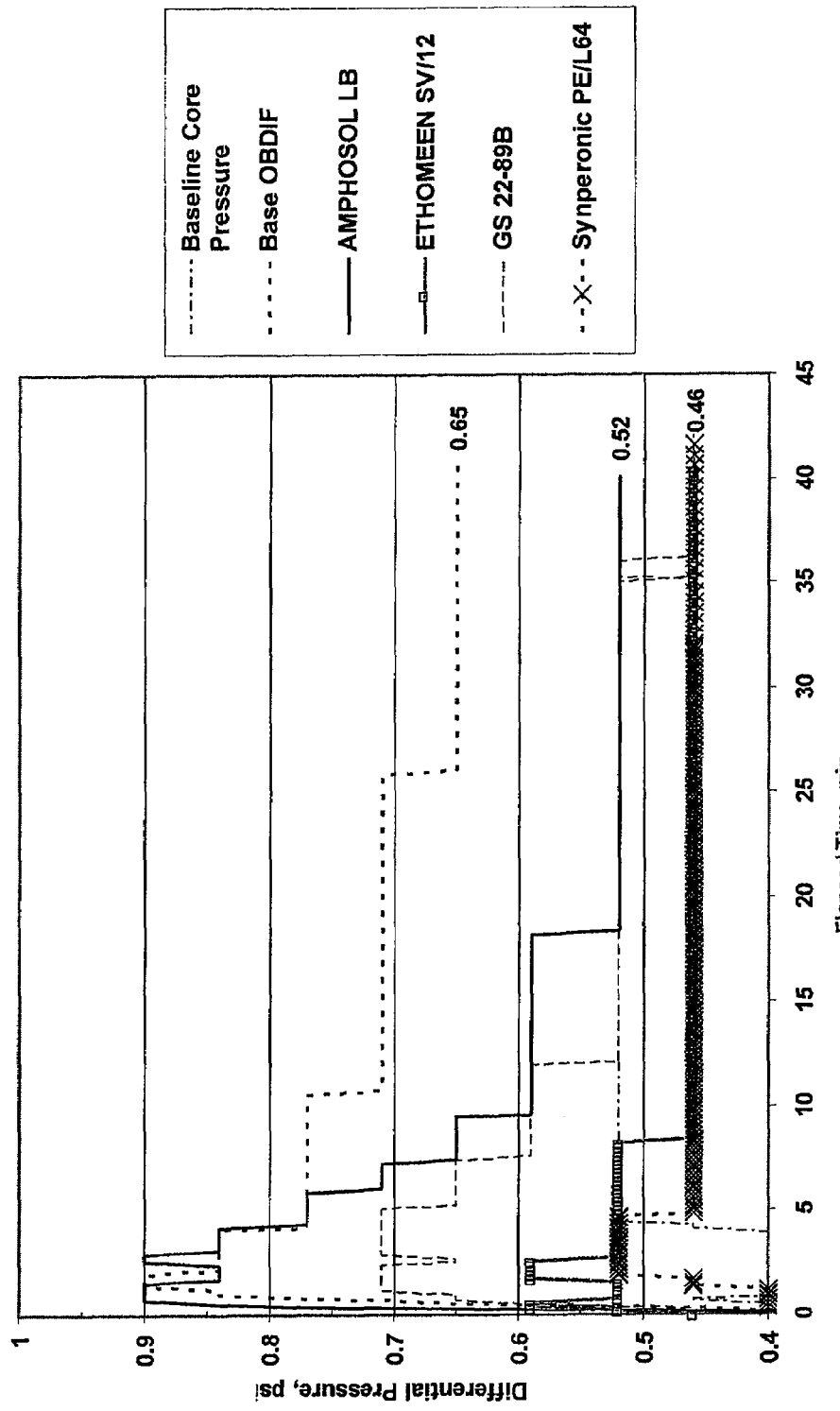
FIG. 1 illustrates data as described in the examples herein.

The present invention relates to clean up operations in subterranean well bores, and more particularly, to surfactant wash treatment fluids that may be used in clean-up operations to render the well bore water-wet and/or remove oil wet solids in well bores that may be present as a result of using oil-based drilling or drill-in fluids or other fluids including aqueous-based fluids that may comprise an oily component.

The compositions and methods of the present invention are applicable to both hydrocarbon-producing wells as well as to injection wells.

Among many other benefits of the invention, the compositions and methods of the present invention are useful in the clean up of oil-wet solids within a well bore to convert them to water-wet solids and then degrade those solids. One of the many other benefits of the compositions and methods of the present invention is that they are believed to be non-damaging to a subterranean formation. Additionally, the compositions and methods of the present invention allow operators to use conventional oil-based drill-in fluids and achieve proper filter cake removal. Perhaps one of the more important potential benefits of the compositions and methods of the present invention is that they remove the oil wet filtercake and leave the formation substantially water-wet in one treatment step. Moreover, the compositions and methods of the present invention may involve either live acids or acid generating components for enhanced flexibility in completion operations. Other potential advantages and benefits may be recognized by those skilled in the art upon reviewing this disclosure.

The methods of the present invention generally involve first drilling a well bore in a subterranean formation using a fluid that is oil-based (e.g., an oil-based drilling or a drill-in fluid, an invert emulsion, a fluid comprising substantially no aqueous components, and the like) or an aqueous-based fluid that comprises an oily component(s), and that as a result of the drilling process, oil-wet solids are deposited on the sides or the surfaces within the well bore. Note that the oil-wet solids may be components of the filter cake, a formation face, a fracture face, a perforation, or on a screen (e.g., a gravel pack screen) or another piece of equipment located in the well bore or subterranean formation. The drilling portion of the process may be performed by the same or a different party than the party that performs the clean-up operation involving the methods and compositions of the present invention; either is contemplated within the scope of this invention. The oil or oily component used in a fluid may include olefins, kerosene, diesel oil, fuel oil, synthetic oils, linear or branched paraffins, esters, acetals, mixtures of crude oil, and combinations and derivatives thereof. Others may be suitable as well as recognized by one skilled in the art.

In the methods of the present invention, to clean up the oil-wet solids, an embodiment of a surfactant wash treatment fluid of the present invention may be used that comprises an aqueous fluid, an acid, and an acid-compatible surfactant. The surfactant wash treatment fluid may be introduced into the subterranean formation by any appropriate technique or method used in the art. As a result of using the surfactant wash treatment fluid, the oil-wet solids in the subterranean formation should become water-wet, and then should degrade. Production can then take place, if desired or appropriate, as for example in a hydrocarbon-producing well.

The surfactant wash treatment fluids of the present invention may comprise an aqueous fluid, a surfactant, and optionally an acid or an acid-generating component. Optionally, the surfactant wash treatment fluids may comprise additional components including corrosion inhibitors, corrosion inhibitor intensifiers, bactericides, antioxidants, enzymes, salts, weighting agents, viscosifiers, and any derivative or combination thereof. Examples of additional additives that may be used if desired include, but are not limited to, pH-adjusting agents, pH-buffers, oxidizing agents, lost circulation materials, scale inhibitors, surfactants, clay stabilizers, paraffin inhibitors, asphaltene inhibitors, penetrating agents, clay control additives, iron control additives, chelators, reducers, oxygen scavengers, sulfide scavengers, emulsifiers, foamers, gases, gelling agents, viscosifiers, derivatives thereof and combinations thereof, and the like. One of ordinary skill in the art with the benefit of this disclosure will be able to determine what additives should be used and in what concentrations to obtain desired performance characteristics of the fluid.

Suitable aqueous fluids that may be used in the surfactant wash treatment fluids of the present invention include any aqueous fluid suitable for use in subterranean applications. In some instances, brines may be preferred. Suitable brines include, but are not limited to: NaCl, NaBr, $CaCl_2$, $CaBr_2$, $ZnBr_2$, sodium formate, potassium formate, caesium formate, and combinations and derivatives of these brines. NaBr may be preferred in some instances. Others brines suitable for use in subterranean applications also may be suitable. The specific brine used may be dictated by the desired density of the resulting surfactant wash treatment fluid. Denser brines may be useful in some instances. A density that is suitable for the application and well bore at issue should be used as recognized by one skilled in the art with the benefit of this disclosure. The aqueous fluid should comprise the balance of the surfactant wash treatment fluid after considering the amount of the acid (or acid-generating component) and/or surfactant present.

In some embodiments, if desired, an acid and/or an acid-generating component may be included in a separate fluid that follows a wash fluid that comprises an aqueous fluid and an acid-compatible surfactant.

Suitable acids that may be used in the surfactant wash treatment fluids of the present invention include any acid suitable for use in subterranean applications. Examples include, but are not limited to, inorganic acids such as hydrochloric acid, hydrofluoric acid, hydrobromic acid, sulfuric acid, phosphoric acid, and nitric acid, and organic acids such as acetic acid, formic acid, glycolic acid, lactic acid, amino acid, dibasic acid, aromatic acid, and aliphatic acids. Combinations and derivatives of these are also suitable. Other acids that are suitable for use in subterranean applications may also be suitable. In some embodiments of the present invention, the acid is hydrochloric acid. In certain embodiments, the amount of acid to include in a surfactant wash treatment fluid of the present invention may be determined by the expected volume of solids (e.g., bridging agents or scale) to be removed. In some instances, the amount of acid to include may vary from about 0.1% to about 40% of the surfactant wash treatment fluid. Considerations that may be taken into account when deciding how much acid to use include: expected thickness of filtercake and calcium carbonate concentration and the volume of the contiguous acid containing breaker. Thus, the diameter of the bore hole, the temperature, and the required brine density should be considered. Other considerations are known to those skilled in the art. Preferably, if an acid is used as opposed to an acid-generating component as described below, the acid remains live until it reacts with the acid-soluble solids in the well bore.

In preferred embodiments, acid-generating components (i.e., those that will generate an acid at a later time) can be used, if desired. Using acid-generating components may be useful in situations where one treatment may be performed to cover an entire section of a well bore. The well bore may be shut-in, and then cleaned up. The time at which the acid-generating component generates an acid may be controlled by the choice of the acid-generating component as well as the conditions present in the well bore.

Suitable acid-generating components may include: poly (ortho esters), orthoesters (which may also be known as "poly ortho ethers" or "ortho ethers"); esters of organic acids such as esters of formic acid, esters of acetic acid, esters of lactic acid, and esters of oxalic acid. Other suitable acid generating components may include other esters; aliphatic polyesters; poly(lactides); poly(glycolides); poly(ϵ-caprolactones); poly (hydroxybutyrates); poly(anhydrides); poly(amino acids); poly lactic acid; or copolymers thereof. Derivatives and combinations also may be suitable. Other suitable acid generating components may include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Ethyl and methyl lactate may also be suitable. Other suitable materials may be disclosed in U.S. Pat. Nos. 6,877,563 and 7,021,383, the disclosures of which are incorporated by reference. Most of these are commercially available in liquid form, and may be used in that form. However, solid forms of these acid-generating components may be used beneficially in the methods of the present invention. They may be useful because they are thought to be non-damaging, and may enhance the clean-up operation. In some instances, the acid-generating components may be reacted with small amounts of reactive materials such as mineral acids, organic acids, acidic anhydrides, p-toluenesulfonic acid, etc. to lower the pH to accelerate the hydrolysis of the acid-generating component. Similarly, in some instances, especially with ortho esters, the hydrolysis rate may be slowed by the addition of a small amount of a strong base such as NaOH, $Na_2CO_3$, $NaHCO_3$ and $Mg(OH)_2$.

The acid-generating component also may generate alcohols down hole that may be beneficial to the operation. These alcohols can act as surface tension reducers, e.g., to keep any nonemulsifiers and surface tension reducers in solution so that they are not absorbed into the formation. These alcohols may be used to clean out condensate blockages that may prevent flow due to accumulation of condensate in the formation or due to accumulation of water or water emulsions in the pore volumes of the formation. These alcohols may also act as hydrate inhibitors. Delayed generation of these alcohols can be beneficial in other ways as well. For instance, the production of these alcohols down hole gives the distinct advantage of being able to provide the alcohols down hole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. Also, these generated alcohols may be preferred over standard alcohols because some standard alcohols contain chemical inhibitors that may interact with the chemistry within the well bore in such a way as to be problematic. Moreover, shipping and storing standard alcohols may be problematic. The particular alcohol given off depends on the acid-generating component being used. For instance, trimethylorthoformate gives off three molecules of methanol for each molecule of formic acid; the methanol may be useful for hydrate inhibition. Others might also be suitable.

Guidelines for choosing a suitable acid-generating component may include the time at which the acid is desired relative to the placement of the acid-generating component in the well bore, the environmental conditions presented, the conditions within the well bore, the temperature of the well bore section in which the acid-generating component is being placed, the composition of the formation water, etc. Other considerations may be evident to those skilled in the art.

Suitable acid-compatible surfactants are preferably non-damaging to the subterranean formation. The acid-compatible surfactant may be included in an amount of up to about 100% of a surfactant wash treatment fluid of the present invention, if desired. Suitable amounts for most cases may be from about 0.1% to about 20%, depending on the circumstances. However, using 5% or less is generally preferred and suitable under most circumstances. In certain embodiments, the acid-compatible surfactant may be included in a surfactant wash treatment fluid of the present invention in amount of from about 0.5 to about 4% of the surfactant wash treatment fluid. Considerations that may be taken into account when deciding how much to use include the amount of solids that will need to be degraded, and the diameter of the well bore. Other considerations may be evident to one skilled in the art with the benefit of this disclosure.

Specific examples of suitable acid-compatible surfactants that may be used in the compositions and methods of the present invention include fatty betaines that are dispersible in oil. Of the suitable fatty betaines, preferably carboxy betaines may be chosen because they are more acid sensitive. Specific examples of such betaines include lauramidopropyl betaine. Other suitable surfactants include ethylene oxide propylene oxide ("EO/PO") block copolymers. Yet other suitable surfactants include fatty amines and fatty polyamines as well as hydrophilically modified amines and polyamines with HLB values of from about 3 to about 10. Suitable hydrophilically modified polyamines can include, but are not limited to, ethoxylated and propoxylated derivatives of these. Specific examples include ethoxylated tallow triamine. An ethoxylated tallow triamine is currently available as "GS 22-89W" from Special Products and ethoxylated oleyl amine currently available from AKZO Nobel as "Ethomeen S/12." Examples of suitable fatty polyamines include, but are not limited to, soya ethylenediamine, and tallow diethylene triamine. Suitable fatty amine examples include, but are not limited to, soya amine. Hydrophilically modified fatty amine examples include ethoxylated soya amines. In some instances, lauramidopropyl betaine may be preferred. Lauramidopropyl betaine is currently available commercially as "AMPHOSOL® LB" from Stepan Company. In other instances, an EO/PO block copolymer may be preferred. A block copolymer of ethylene oxide and propylene oxide is currently available commercially as "SYNPERONIC® PE/L64" from Uniqema.

In one embodiment, the present invention provides a method comprising: providing an oil-wet well bore surface; providing a surfactant wash treatment fluid that comprises an acid-compatible surfactant, an acid and/or an acid-generating component, and an aqueous fluid; contacting the oil-wet well bore surface with the surfactant wash treatment fluid; allowing the oil-wet well bore surface to become water-wet; and producing fluids from the formation.

In one embodiment, the present invention provides a method comprising: providing an oil-wet solid located in a subterranean formation; providing a surfactant wash treatment fluid that comprises an acid-compatible surfactant, an acid and/or an acid-generating component, and an aqueous fluid; contacting the oil-wet solid with the surfactant wash treatment fluid; and allowing the oil-wet solid to become water-wet.

In one embodiment, the present invention provides a method comprising: providing an oil-wet well bore surface; providing a surfactant wash treatment fluid that comprises an acid-compatible surfactant, an acid and/or an acid-generating component, and an aqueous fluid; and contacting the well bore surface with the surfactant wash treatment fluid.

In one embodiment, the present invention provides a method comprising: drilling a well bore using an oil-based fluid or an aqueous fluid comprising an oily component; creating an oil-wet well bore surface; providing a surfactant wash treatment fluid that comprises an acid-compatible surfactant, an acid and/or an acid-generating component, and an aqueous fluid; contacting the oil-wet well bore surface with the surfactant wash treatment fluid; and allowing the oil-wet well bore surface to become water wet.

In one embodiment, the present invention provides a method comprising: drilling a well bore in a subterranean formation using a fluid that is oil-based or an aqueous-based fluid that comprises an oily component wherein oil-wet solids are deposited on a surface within the well bore; providing a surfactant wash treatment fluid that comprises an aqueous fluid, and an acid-compatible surfactant, and an acid and/or an acid-generating component; introducing the surfactant wash treatment fluid into the subterranean formation; and allowing production to occur.

In one embodiment, the present invention provides a surfactant wash treatment fluid for use in a subterranean formation comprising an aqueous fluid, an acid-compatible surfactant, an acid and/or an acid-generating component.

To facilitate a better understanding of the present invention, the following examples of some of the preferred embodiments are given. In no way should such examples be read to limit the scope of the invention.

EXAMPLES

Example 1

Screening of Surfactants using 15% wt. HCl/NaBr with a "Modified" Permeability Tester A 10 bbl equivalent batch of the base 9.5 ppg, XP-07 based, 65/35 oil-to-water ratio, and 365,478 ppm Water Phase Salinity, water-in-oil fluid was mixed using a Silverson fitted with a square head emulsion screen. This fluid was used in building the oily filter cakes that were evaluated in the following examples. The formulation components, rheological properties, and filtration properties can be seen in Table 1. In these examples, "XP-07" is paraffin base oil available from Halliburton Energy Services in Duncan, Okla. or Houston, Tex. "LE SUPERMUL" is an emulsifier available from Halliburton Energy Services in Duncan, Okla. or Houston, Tex. "GELTONE II" is an organophilic clay available from Halliburton Energy Services in Duncan, Okla. or Houston, Tex. "RHEMOD L" is a liquid rheology modifier available from Halliburton Energy Services in Duncan, Okla. or Houston, Tex. "BARACARB 5," "BARACARB 25," and "BARACARB 50" are all bridging agents available from Energy Services in Duncan, Okla. or Houston, Tex. "REV DUST™" is simulated drill solids (clay/quartz solids) available from Milwhite in Brownsville, Tex. The total filtrate was calculated in this manner: total filtrate, ml=(30 minute filtrate volume—30 sec. spurt volume)*2+30 sec. spurt.

TABLE 1

Fluid Formulations and Properties
9.5 lb/gal, 65/35 Oil-to-Water Ratio, 364 K WPS

| Sample Mark | Mixing time, min | Amount | |
|---|---|---|---|
| XP-07, bbl | — | 0.516 | |
| LE SUPERMUL, lb | 5 | 12 | |
| Lime, lb | 2 | 2 | |
| 11.3 ppg CaCl$_2$ Brine, lb | 10 | 0.350 | |
| GELTONE II, lb | 10 | 3 | |
| RHEMOD L, lb | 5 | 2.5 | |
| BARACARB 5, lb | 5 | 30.5 | |
| BARACARB 25, lb | 5 | 6.5 | |
| BARACARB 50, lb | 5 | 6.5 | |
| Rev Dust, lb | 15 | 30 | |
| Total mixing time, min | | 62 | — |
| Equipment used for mix | | Silverson | Paddle |
| Volume mixed, bbl | | 10 | 10 |
| Rolled @ 150° F., hr | | — | 16 |
| Cooling method | | Air | Air |
| Cooling time, min | | 60 | 60 |
| Equipment used for stir | | — | Paddle |
| Stirred, min | | 10 | 10 |
| Temperature, ° F. | | 120 | 120 |
| Plastic viscosity, cP | | 21 | 24 |
| Yield point, lb/100 ft$^2$ | | 19 | 16 |
| 10 Sec gel, lb/100 ft$^2$ | | 12 | 9 |
| 10 Min gel, lb/100 ft$^2$ | | 14 | 13 |
| 30 Min gel, lb/100 ft$^2$ | | — | 11 |
| Electrical stability @ 120° F., v | | 375 | 208 |
| HTHP on 20 micron core | | | |
| HTHP spurt @180° F., ml | | — | 0.5 |
| HTHP 30 min. filtrate @ 180° F. | | — | 2.2 |
| HTHP corrected filtrate, ml | | — | 4.9 |
| Fann 35 dial readings | | | |
| 600 rpm | | 61 | 64 |
| 300 rpm | | 40 | 40 |
| 200 rpm | | 32 | 31 |
| 100 rpm | | 23 | 21 |
| 6 rpm | | 10 | 8 |
| 3 rpm | | 9 | 7 |

The HCl live acid testing protocol used to evaluate the surfactants was as follows. First, a 9.5 ppg, XP-07 based, 65/35 oil-to-water ratio, and 365,478 ppm Water Phase Salinity water-in-oil fluid was formulated and mixed. Table 1 illustrates the components and properties of the fluid.

Next, 100 ml of the fluid was used with a double ended filtration cell fitted with a 20 micron aloxite disc and an end-grooved end cap to build a filter cake. The filter cake was formed by running a high temperature high pressure test using a standard 30 minute run at 180° F. with 500 psi differential across the aloxite disc (500 psi on top regulator, no back pressure on the bottom regulator was used). The grooves in the end cap are thought to facilitate any filtrate movement and to minimize the chances of the breaking of the aloxite ceramic disc. Any filtrate was collected in a 500 ml beaker. After the 30 minute run time had expired, the cell was cooled by letting it sit for 16 hours.

Next, after the 16 hour cooling period, the cell was opened and the excess fluid was poured out. The resulting filter cake was rinsed with approximately 50 to 75 ml of XP-07 base oil to remove excess loosely consolidated filter cake solids.

Next, 100 ml of a surfactant wash treatment fluid were made by combining 58.7 grams of tap water and 9.1 grams of dry NaBr salt. The mixture was stirred with spatula until the salt dissolved in the water. At that point, 46.3 grams of concentrated HCl (37% by wt.) were added to the mixture, and the mixture was then stirred with a spatula to obtain homogeneity. Finally, 2.6 grams of a surfactant (either "ETHOMEEN SV/12" available from AKZO Nobel, "AMPHOSOL® LB" from Stepan Company, "GS 22-89B" from Special Products, or "SYNPERONIC® PE/L64" from Uniqema) were added to the mixture for 100 ml of the mixture; this is a 9 lb/bbl loading. The resulting mixture was a 15% by wt. HCl solution with a 9.5 ppg density.

Next, the acid solution was mixed thoroughly and then poured into the double ended filtration cell and onto the remaining filter cake on the aloxite ceramic disc from above. The cell was then reassembled and placed into a heating jacket pre-heated to 180° F. 100 psi was applied to the top regulator (no bottom regulator was required). Once the cell reached 180° F., a timer was set for 4 hours. Every hour, the bottom valve was opened to see if acid breaker filtrate was present, which was thought to indicate that some filter cake deterioration had occurred. The acid breaker filtrate was collected in a 500 ml beaker.

After the 4 hour soak period, the double ended filtration cell was closed and removed from the heating jacket. The cell was then cooled in a water bath.

After the cooling period, the double ended filtration cell was opened and any remaining surfactant wash treatment fluid was removed. The cell was filled with "SOLTROL® 170," which is paraffin oil available from Chevron. The end cap was used in a modified permeability test setup. The cell was connected to an Alltech model 526 HPLC constant rate/variable pressure pump using a reservoir of SOLTROL® 170 (paraffin oil) as the mobile phase. The pump output was then set to 10 ml/min. The valve was then opened, and pumping was commenced in the production direction. The pressure required to flow SOLTROL® 170 (paraffin oil) across the filter cake over time was the data that was collected. Data was collected for a total of 40 minutes per sample.

The cell was then disassembled, and the Soltrol 170/HCl/surfactant mixture was poured out. The aloxite disc was then carefully extracted.

The pressure results were then graphed. The degree of cleanup was visually judged.

The data gathered by performing the tests outlined above indicated that the products AMPHOSOL LB, GS 22-89 B (lauramidopropyl betaine), and "SYNPERONIC® PE/L64" (a block copolymer of ethylene oxide and propylene oxide) all appeared to have significant amounts of acid filtrate collected during the soaking period. The presence of acid filtrate was noted in order to see if any correlation between the amount of filtrate being allowed through the core and the amount of cake removal could be made. From these experiments, in our view, the products that were associated with the best filter cake removal were ETHOMEEN SV/12, GS 22-89 B, "SYNPERONIC® PE/L64", and AMPHOSOL LB. However, in these tests, the ETHOMEEN SV/12 product appeared to show lower dispersibility than the GS 22-89 B and the AMPHOSOL LB in the surfactant wash treatment fluid. The ETHOMEEN SV/12 did eventually disperse fully after approximately 5 minutes of stirring with a spatula.

Figure 3:
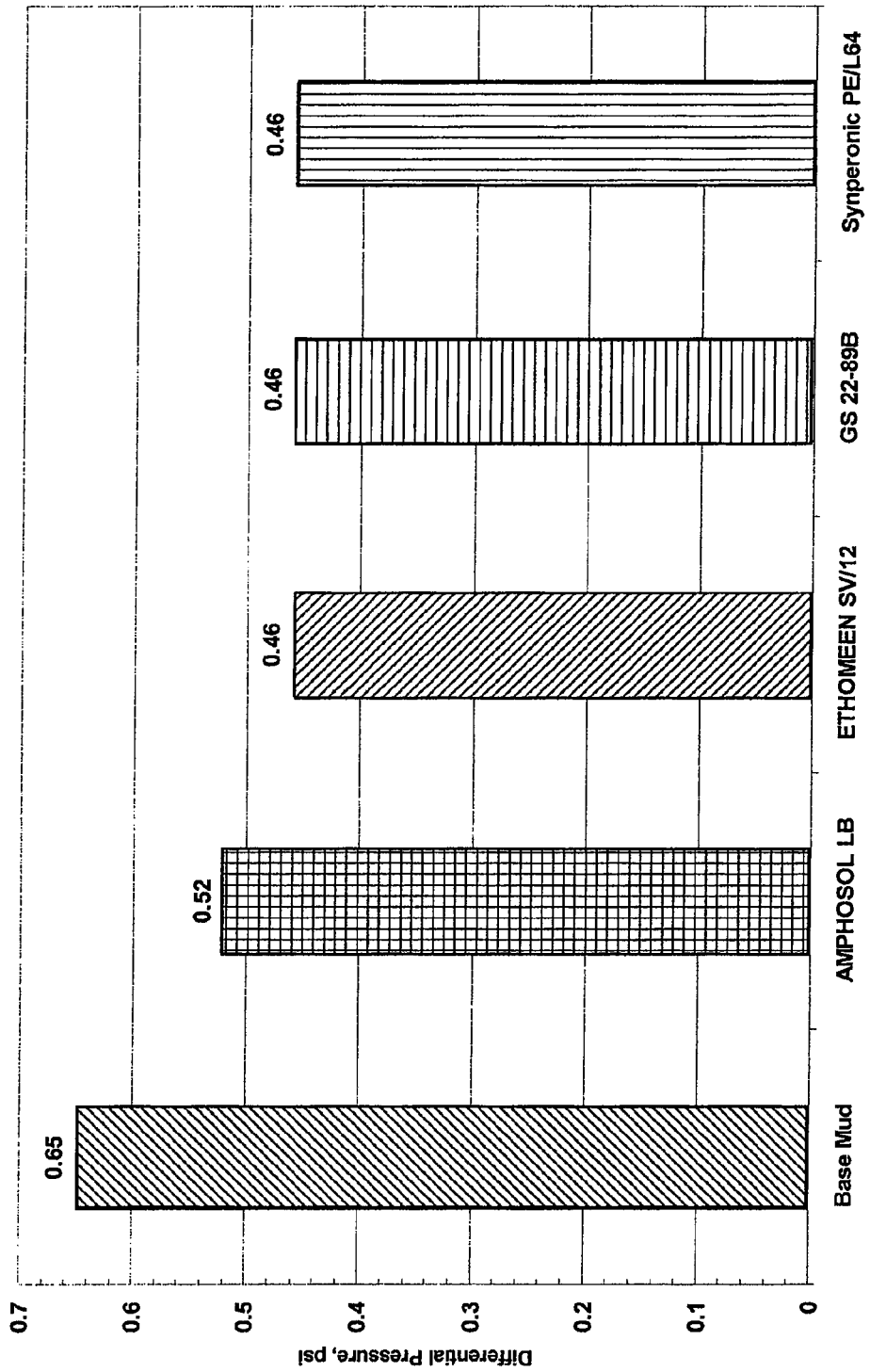
FIG. 3 illustrates data as described in the examples herein.

The pressure needed to flow across the core through filter cake was measured via a Sensotec 100 psi amplified pressure transducer during the flowing of Soltrol 170. The surfactants that in our view were associated with the best cake removal also appeared to require less pressure to flow through the core and filter cake. For instance, the filter cake with no surfactant wash treatment had a lift off pressure that was measured at 0.65 psi. The filter cake treated with a combination of HCl and AMPHOSOL LB resulted in a lift off pressure of 0.52. This indicated a decrease in pressure of about 20%. The lift off pressures for the filter cake treated with ETHOMEEN SV/12, GS 22-89 B, and "SYNPERONIC® PE/L64" (a block copolymer of ethylene oxide and propylene oxide) all provide lift off pressures of 0.46 psi. This indicates a decrease in the lift off pressure by over about 29%. FIG. 1 illustrates the pressure vs. time data from these results, while FIG. 3 represents the equilibrium pressure achieved while pumping.

Example 2

Screening of Surfactants using
BDF-325/NaBr/Gravel Pack with "Modified"
Permeability Tester Several surfactants that were used in the first example described above were used in this example. These surfactants were AMPHOSOL LB, GS 22-89 B, ETHOMEEN SV/12, and Synperonic PE/L64. "BDF-325," which is a delayed acid breaker available from Halliburton Energy Services in Duncan, Okla. or Houston, Tex., was used in a 20% v/v concentration with one of these surfactants in a surfactant wash treatment fluid in a gravel pack simulation. NaBr salt was again utilized to help provide the adequate density for the surfactant wash treatment fluid, and 20/40 sand was utilized for the gravel pack application.

The testing protocol for this example was as follows.

First, a 10 bbl equivalent batch of the base 9.5 ppg, XP-07 based, 65/35 oil-to-water ratio, and 365,478 water phase salinity water-in-oil fluid was mixed using a Silverson fitted with a square head emulsion screen as described above. Table 1 contains the components, rheological properties, and filtration properties.

Next, 80 ml of fluid was taken and placed in a double ended filtration cell fitted with a 20 micron core and grooved end cap. A filter cake was built by running a high temperature high pressure test using a standard 30 minute run at 180° F. with 500 psi differential pressure across the core (500 psi on top regulator, no bottom regulator will be used).

The cell was then cooled and any excess fluid was removed. The filter cake was then rinsed with approximately 50 to 75 ml of XP-07 base oil to remove excess loosely consolidated filter cake solids.

To make 80 ml of the surfactant wash treatment fluid used in this example, first 64 ml (71.9 g.) of a 9.38 ppg NaBr salt solution was mixed with a spatula, and then 16 ml of BDF-325 (20% v/v, or 19.2 g.) was added. The mixture was combined, and then one of the surfactants (AMPHOSOL LB, GS 22-89 B, ETHOMEEN SV/12, or Synperonic PE/L64) was added at a loading of 2.08 grams for 80 ml. The mixture was then mixed thoroughly with a spatula, resulting in a 9 lb/bbl equivalent loading.

Next, 100 grams of 20/40 sand was weighed out for gravel pack simulation. The sand was poured into the cell with the surfactant wash treatment fluid onto the filter cake and core.

The cell was re-assembled and placed into a heating jacket pre-heated to 180° F. 100 psi was applied to the top regulator (no bottom regulator was required). Once the cell reached 180° F., the timer was set at 16 hours. After the 16 hour soak period, the bottom valve was opened to see if the acid breaker filtrate was present, which would indicate that some filter cake deterioration had occurred. The acid breaker filtrate was collected in a 500 ml beaker.

After the 16 hour soak period, the cell was removed and cooled in a water bath. After the cooling period, the cell was connected to an Alltech model 526 HPLC constant rate/variable pressure pump using a reservoir of SOLTROL® 170 (paraffin oil) as the mobile phase. The pump was set to output to 10 ml/min of SOLTROL® 170 (paraffin oil). The valve was opened, and started pumping in the production direction. Pressure data was collected for a total of 40 minutes per sample.

The cell was then disassembled, and the gravel pack sand and Soltrol 170/BDF-325/NaBr mixture were poured out of the cell. The aloxite disc was then carefully extracted. The pressure results were noted and observations were made.

In our view, each of the surfactants, AMPHOSOL LB, GS 22-89 B, ETHOMEEN SV/12, and "SYNPERONIC® PE/L64" (a block copolymer of ethylene oxide and propylene oxide), exhibited good dispersibility in the BDF-325/NaBr mixtures. There was acid filtrate collected after the 16 hour soaking period for all of the samples tested.

Figure 2:
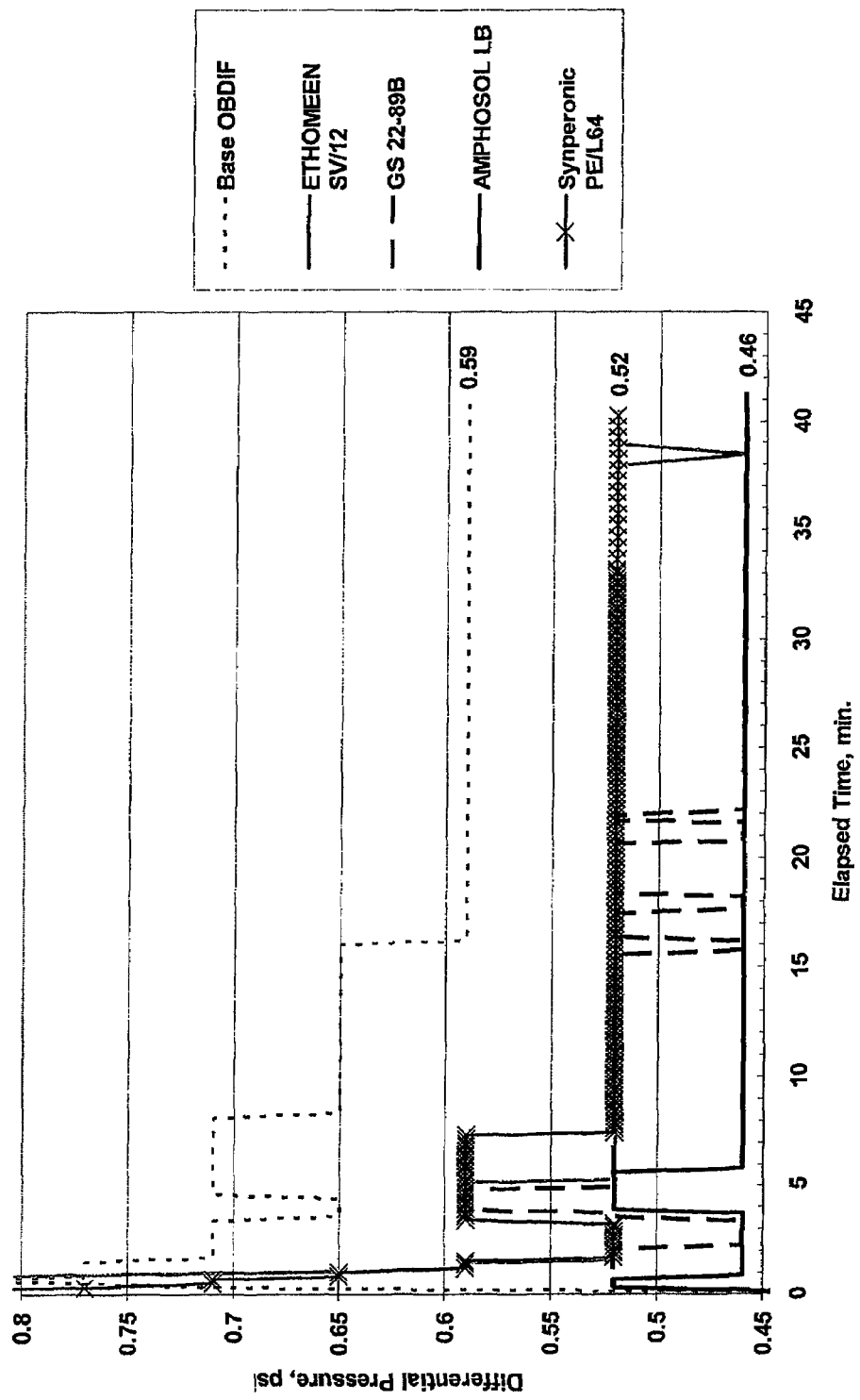
FIG. 2 illustrates data as described in the examples herein.
Figure 4:
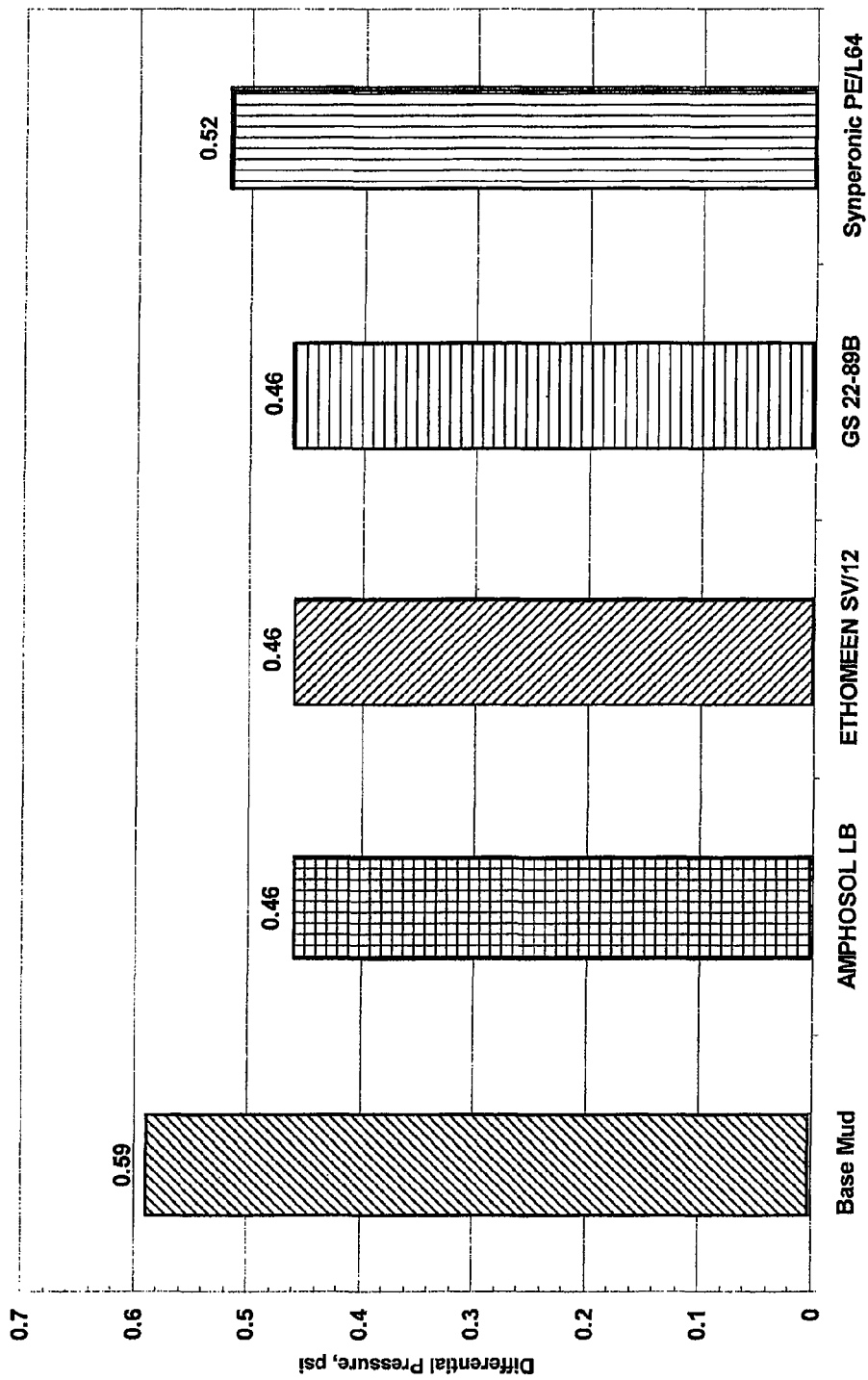
FIG. 4 illustrates data as described in the examples herein.

The pressure needed to flow across the core through filter cake was measured via a Sensotec 100 psi amplified pressure transducer during the flowing of Soltrol 170. The core treated with no surfactant had a differential pressure across the core of 0.59 psi. AMPHOSOL LB and GS 22-89 B both produced a 0.46 psi differential. ETHOMEEN SV/12 had a 0.52 psi differential. The pressure vs. time data can be seen in FIG. 2, while FIG. 4 represents the equilibrium pressure achieved while pumping.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:
1. A method comprising:
providing an oil-wet well bore surface;
providing a surfactant wash treatment fluid that comprises: an acid-compatible surfactant; an acid, an acid-generating component, or a mixture thereof; and an aqueous fluid;
introducing the surfactant wash treatment fluid into a subterranean formation;
allowing the oil-wet well bore surface to become water-wet through a process comprising contacting oil-wet well bore surface with the acid-compatible surfactant in the surfactant wash treatment fluid; and
producing fluids from the subterranean formation.
2. The method of claim 1 wherein the surfactant wash treatment fluid comprises an additive chosen from the group consisting of: corrosion inhibitors; corrosion inhibitor intensifiers; bactericides; antioxidants; enzymes; salts; weighting agents; viscosifiers; pH-adjusting agents; pH-buffers; oxidizing agents; lost circulation materials; scale inhibitors; surfactants; clay stabilizers; paraffin inhibitors; asphaltene inhibitors; penetrating agents; clay control additives; iron control additives; chelators; reducers; oxygen scavengers; sulfide scavengers; emulsifiers; foamers; gases; gelling agents; viscosifiers; derivatives thereof; and combinations thereof.

3. The method of claim 1 wherein the aqueous fluid comprises a brine chosen from the group consisting of: NaCl brines, NaBr brines, $CaCl_2$ brines, $CaBr_2$ brines, $ZnBr_2$ brines, sodium formate, potassium formate, caesium formate, and combinations thereof.

4. The method of claim 1 wherein the acid comprises an acid selected from the group consisting of: inorganic acids; hydrochloric acid; hydrofluoric acid; hydrobromic acid; sulfuric acid; phosphoric acid; nitric acid; organic acids; acetic acid; formic acid; glycolic acid; lactic acid; amino acid; dibasic acid; aromatic acids; aliphatic acids; derivatives thereof; and combinations thereof.

5. The method of claim 1 wherein the acid-generating component comprises a component selected from the group consisting of: poly(ortho esters); orthoesters; esters of organic acids; esters of formic acid; esters of acetic acid; esters of lactic acid; esters of oxalic acid; esters; aliphatic polyesters; poly(lactides); poly(glycolides); poly($\epsilon$-caprolactones); poly(hydroxybutyrates); poly(anhydrides); poly (amino acids); poly lactic acid; ethylene glycol monoformate; ethylene glycol diformate; diethylene glycol diformate; glyceryl monoformate; glyceryl diformate; glyceryl triformate; triethylene glycol diformate; formate esters of pentaerythritol; ethyl lactate; methyl lactate; copolymers thereof; derivatives thereof; and combinations thereof.

6. The method of claim 1 wherein the acid-generating component generates an alcohol down hole.

7. The method of claim 1 wherein the acid-generating component has been reacted with a reactive material chosen from the group consisting of: mineral acids; organic acids; acidic anhydrides; p-toluenesulfonic acid; NaOH; $Na_2CO_3$; $NaHCO_3$; and $Mg(OH)_2$.

8. The method of claim 1 wherein the acid-compatible surfactant is included in an amount of up to about 100% of the surfactant wash treatment fluid.

9. The method of claim 8 wherein the acid-compatible surfactant is included in an amount of up from about 0.1% to about 20%.

10. The method of claim 1 wherein the acid-compatible surfactant comprises a surfactant chosen from the group consisting of: fatty betaines; carboxy betaines; lauramidopropyl betaine; ethylene oxide propylene oxide block copolymers; fatty amines; fatty polyamines; hydrophilically modified amines; polyamines with HLB values of from about 3 to about 10; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations of these.

11. A method comprising:
providing an oil-wet solid located in a subterranean formation;
providing a surfactant wash treatment fluid that comprises an acid-compatible surfactant, an acid-generating component, and an aqueous fluid;
introducing the surfactant wash treatment fluid into the subterranean formation; and
allowing the oil-wet solid to become water-wet through a process comprising contacting the oil-wet solid with the acid-compatible surfactant in the surfactant wash treatment fluid.

12. The method of claim 11 wherein the oil-wet solid is located in an injection well in a subterranean formation.

13. The method of claim 11 wherein the aqueous fluid comprises a brine chosen from the group consisting of: NaCl brines, NaBr brines, $CaCl_2$ brines, $CaBr_2$ brines, $ZnBr_2$ brines, sodium formate, potassium formate, caesium formate, and combinations thereof.

14. The method of claim 11 wherein the acid-generating component comprises a component selected from the group consisting of: poly(ortho esters); orthoesters; esters of organic acids; esters of formic acid; esters of acetic acid; esters of lactic acid; esters of oxalic acid; esters; aliphatic polyesters; poly(lactides); poly(glycolides); poly($\epsilon$-caprolactones); poly(hydroxybutyrates); poly(anhydrides); poly (amino acids); poly lactic acid; ethylene glycol monoformate; ethylene glycol diformate; diethylene glycol diformate; glyceryl monoformate; glyceryl diformate; glyceryl triformate; triethylene glycol diformate; formate esters of pentaerythritol; ethyl lactate; methyl lactate; copolymers thereof; derivatives thereof; and combinations thereof.

15. The method of claim 11 wherein the acid-compatible surfactant is included in an amount of up from about 0.1% to about 20%.

16. The method of claim 11 wherein the acid-compatible surfactant comprises a surfactant chosen from the group consisting of: fatty betaines; carboxy betaines; lauramidopropyl betaine; ethylene oxide propylene oxide block copolymers; fatty amines; fatty polyamines; hydrophilically modified amines; polyamines with HLB values of from about 3 to about 10; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations of these.

17. A method comprising:
providing an oil-wet well bore surface;
providing a surfactant wash treatment fluid that comprises:
an acid-compatible surfactant; an acid, an acid-generating component, or a mixture thereof; and an aqueous fluid;
introducing the surfactant wash treatment fluid into a subterranean formation; and
allowing the oil-wet well bore surface to become water-wet through a process comprising contacting the oil-wet well bore surface with the acid-compatible surfactant in the surfactant wash treatment fluid.

18. The method of claim 17 wherein the acid-compatible surfactant comprises a surfactant chosen from the group consisting of: fatty betaines; carboxy betaines; lauramidopropyl betaine; ethylene oxide propylene oxide block copolymers; fatty amines; fatty polyamines; hydrophilically modified amines; polyamines with HLB values of from about 3 to about 10; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations of these.

19. The method of claim 17 wherein the acid comprises an acid selected from the group consisting of: inorganic acids; hydrochloric acid; hydrofluoric acid; hydrobromic acid; sulfuric acid; phosphoric acid; nitric acid; organic acids; acetic acid; formic acid; glycolic acid; lactic acid; amino acid; dibasic acid; aromatic acids; aliphatic acids; derivatives thereof; and combinations thereof; and/or the acid-generating component comprises a component selected from the group consisting of: poly(ortho esters); orthoesters; esters of organic acids; esters of formic acid; esters of acetic acid; esters of lactic acid; esters of oxalic acid; esters; aliphatic polyesters; poly(lactides); poly(glycolides); poly($\epsilon$-caprolactones); poly(hydroxybutyrates); poly(anhydrides); poly(amino acids); poly lactic acid; ethylene glycol monoformate; ethylene glycol diformate; diethylene glycol diformate; glyceryl monoformate; glyceryl diformate; glyceryl triformate; triethylene glycol diformate; formate esters of pentaerythritol; ethyl lactate; methyl lactate; copolymers thereof; derivatives thereof; and combinations thereof.

20. The method of claim 17 wherein the acid-generating component comprises a component selected from the group consisting of: poly(ortho esters); orthoesters; esters of organic acids; esters of formic acid; esters of acetic acid; esters of lactic acid; esters of oxalic acid; esters; aliphatic polyesters; poly(lactides); poly(glycolides); poly($\epsilon$-caprolactones); poly(hydroxybutyrates); poly(anhydrides); poly(amino acids); poly lactic acid; ethylene glycol monoformate; ethylene glycol diformate; diethylene glycol diformate; glyceryl monoformate; glyceryl diformate; glyceryl triformate; triethylene glycol diformate; formate esters of pentaerythritol; ethyl lactate; methyl lactate; copolymers thereof; derivatives thereof; and combinations thereof.

\* \* \* \* \*